(12) United States Patent
Waldow et al.

(10) Patent No.: US 6,453,765 B1
(45) Date of Patent: Sep. 24, 2002

(54) ABUTMENT WITH MOLDED PART FOR FASTENING ACTUATING PULLS

(75) Inventors: Andreas Waldow; Arnd Bürger, both of Einbeck (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 61 days.

(21) Appl. No.: 09/645,754

(22) Filed: Aug. 24, 2000

(51) Int. Cl.$^7$ .................................. F16C 1/22
(52) U.S. Cl. .................. 74/502.6; 74/502.4; 403/10; 403/265; 403/326
(58) Field of Search .................. 74/502.4, 502.6; 403/243, 10, 265, 326

(56) References Cited

U.S. PATENT DOCUMENTS

| | | | | |
|---|---|---|---|---|
| 4,023,435 A | * | 5/1977 | LaDue .................. 74/502.4 |
| 4,635,498 A | | 1/1987 | Zimmermann et al. |
| 4,763,541 A | | 8/1988 | Spease |
| 5,199,320 A | * | 4/1993 | Spease et al. .............. 74/502.4 |
| 5,217,731 A | * | 6/1993 | Fallent .................. 249/178 |
| 5,461,938 A | * | 10/1995 | Froling et al. .............. 403/353 |
| 5,653,148 A | * | 8/1997 | Reasoner .................. 403/327 |
| 5,682,797 A | * | 11/1997 | Kelley et al. .................. 403/11 |
| 5,683,418 A | * | 11/1997 | Luscombe et al. .......... 606/104 |
| 5,884,531 A | * | 3/1999 | Koenig .................. 74/500.5 |
| 6,105,458 A | * | 8/2000 | Casas Gomila et al. ... 74/501.5 R |

FOREIGN PATENT DOCUMENTS

| | | | | |
|---|---|---|---|---|
| DE | 195 28 953 | | 2/1996 | |
| GB | 2 241 767 A | * | 11/1991 | ............. F16C/1/08 |
| WO | WO 98/25036 | | 6/1998 | |

* cited by examiner

Primary Examiner—Rodney H Bonck
Assistant Examiner—David D. Le
(74) Attorney, Agent, or Firm—Cohen, Pontani, Lieberman & Pavane

(57) ABSTRACT

An abutment with a molded part for the fastening of actuating pulls, preferably for actuating pulls at the transmission in motor vehicles. The abutment has a base plate with a self-locking wedge, a perforated plate and a stop which protrudes relative to the base plate. A molded part into which at least one cable pull projects and is enclosed and held by the molded part. The molded part has a conical support surface into which the self-locking wedge fits. A guide rod projects into the molded part and can snap into the perforated plate of the abutment. A lock is provided at the molded part and can be unlocked by the stop of the abutment and provides a connection between the abutment and the molded part.

6 Claims, 2 Drawing Sheets

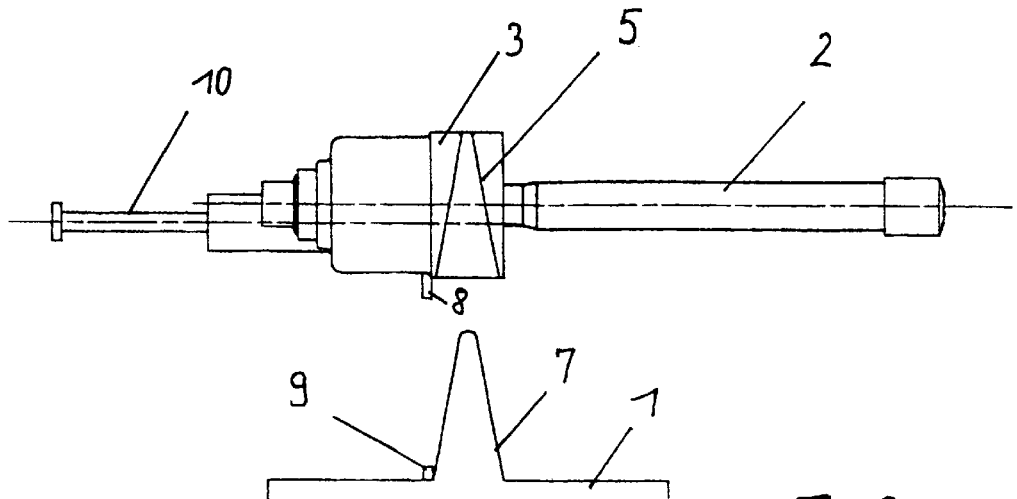
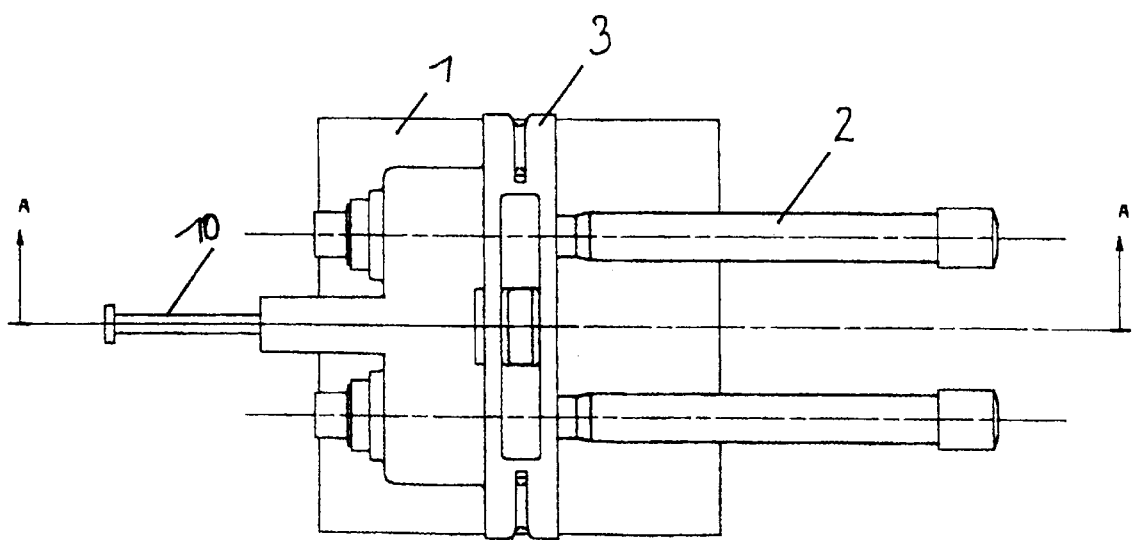

Fig. 4
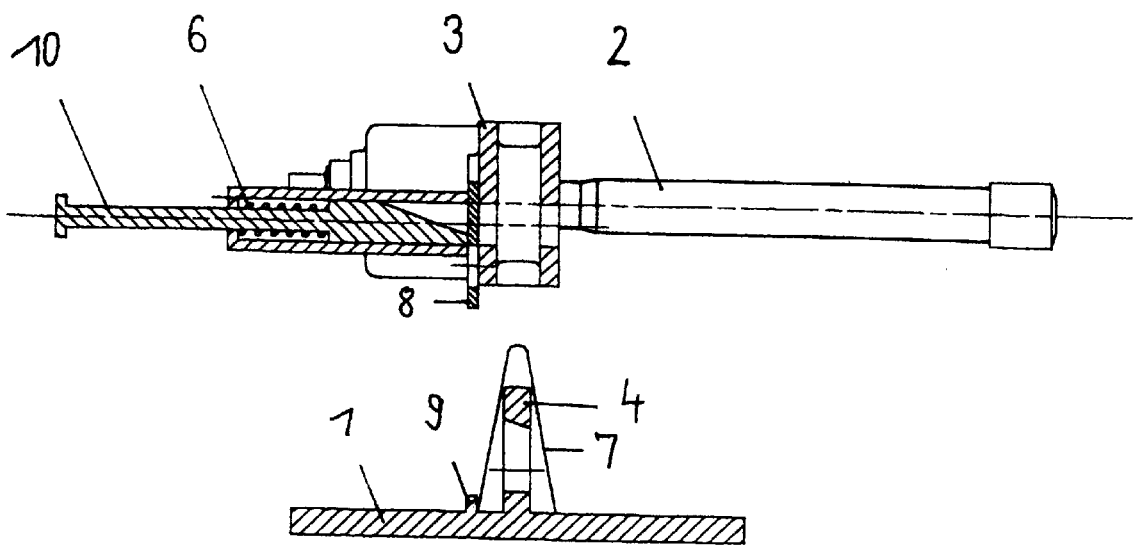
Fig. 5
Fig. 6
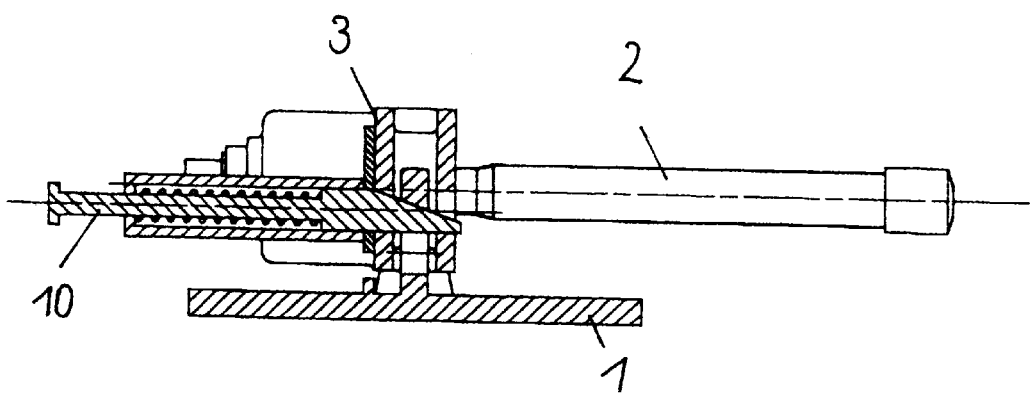

ABUTMENT WITH MOLDED PART FOR FASTENING ACTUATING PULLS

BACKGROUND OF THE INVENTION

1. Field of the Invention

The invention relates to an abutment with a molded part for fastening actuating pulls.

The abutment according to the invention with a molded part for fastening actuating pulls is particularly suitable for actuating pulls at a transmission in motor vehicles. The forces acting during gear shifting are supported by means of the abutment. The sheath of the actuating pull is fixedly connected with the transmission, and the applied force provides for the required shifting path.

2. Discussion of the Prior Art

In conventional abutments, the end fitting of the cable pull is inserted into an abutment and fastened therein by various mechanisms. These mechanisms can be attachment clamps, retaining rings or clips which are arranged directly on the abutment or end fitting. These solutions known from the prior art have a number of problems reflected in an excessive freedom from play, problems with positioning and compensation of tolerances, secure fixing and the unambiguity or clarity of fixing. There are cases in which the end fitting has not been correctly secured and yet will be functional for a certain time because, due to the tight fit between the abutment and the end fitting, incorrect locking or fixing is not immediately recognizable and is not noticeable until after several hours of operation, so that in the case of automobiles this leads the customer to the conclusion that there were manufacturing defects in the factory. Further, in the solutions according to the known prior art there is increased expenditure on assembly since a number of loosely connected parts are used. Complete accessibility of the parts at the transmission is often not ensured. Therefore, handling is difficult and the assembly force to be applied is restricted. This is particularly true when the space for assembly and disassembly with tools is distinctly difficult to access. In shifting mechanisms with a plurality of cable pulls, this set of problems is compounded, resulting in even more sources of defects.

WO 98/25036 A1 describes an abutment and molded part for fastening actuating pulls comprising a base plate with a conical support surface and a perforated plate identical to the base plate, a molded part into which a cable pull projects, and a guide rod which can snap into the perforated plate of the abutment. Due to the fact that the conical flank is not arranged in the axial direction, there is no freedom from play axially. The conical flank of the device also does not act as a self-locking wedge because, without additional locking, removal of the molded part is possible. Moreover, it is only possible to secure the connection by additional actuation of the locking pin. Accordingly, this device does not provide an uncomplicated connection for the fastening of actuating pulls with economical assembly.

SUMMARY OF THE INVENTION

Therefore, it is the object of the present invention to provide a mechanism for the fastening of one or more actuating pulls which enables fastening with economical and no tolerances in a fast, reliable and clear manner even in inaccessible places.

Pursuant to this object, and others which will become apparent hereafter, one aspect of the present invention resides in an abutment having a base plate with a self-locking wedge, a perforated plate and a stop which protrudes relative to the base plate. This abutment should be formed of one part in practice, wherein the work material can be plastic, from which this part can be produced by injection molding in a simple, uncomplicated manner.

A molded part is inserted into this abutment; at least one cable pull projects into this molded part and is enclosed and held by the molded part. Also, this molded part can be a plastic part which simultaneously forms the injection molding around the cable pull. If more than one cable pull is to be fastened, a plurality of cable pulls project into the molded part and are enclosed by the molded part.

The molded part has at least one conical support surface into which the self-locking wedge fits. If the abutment has more than one wedge, the molded part can also have a plurality of conical support surfaces so as to increase stability between the molded part and the abutment.

A guide rod projects into the molded part so that it can snap into the perforated plate of the abutment. In the simplest case, the guide rod, which can have a rounded shape, is arranged in a tubular member, wherein there is a thickening or enlargement positioned at one end by which the guide rod can be pulled out in opposition to spring force, and the other end has a wedge shape. The guide rod is pulled out of the molded part, and the spring is tensed in the tube. A lock is arranged so as to be displaceable transverse to the movement direction of the guide rod, the guide rod being supported against a part of the lock in the tensioned state. The other part of the lock has an opening through which the front part of the guide rod can slide. When the lock is moved so that the opening frees the path of the guide rod, the guide rod slides through the lock so as to be propelled by spring force. It is possible to have a plurality of guide rods for high stability between the abutment and the molded part. However, it is also possible to connect a plurality of wedge-shaped ends with a guide rod.

The guide rod is to be pulled out before the molded part is connected with the abutment, wherein the spring is tensioned and the guide rod is held in the tensioned position by locking.

The guide rod is advantageously arranged in the direction opposite to the cable pull or cable pulls. If this is not permitted by the free space for assembly, it is also possible to arrange the lock on the same side as the cable pull.

When mounted, the molded part is pressed in the direction of the abutment, wherein a stop at the abutment acting against the locking of the molded part displaces the molded part so that the guide rod slides through the hole of the lock and, because of its shape, completely opens the lock and slides into the hole of the perforated plate and, in so doing, connects the abutment with the molded part, locking them together.

In this respect, the hole in the perforated plate is advantageously formed in such a way that it has a wedge shape into which the wedge of the lock can slide such that an especially good connection of the two parts is brought about. This is the case particularly when it also has a wedge shape opposite to the wedge face.

Due to the fact that the lock and perforated plate as well as the abutment and molded part have wedge-shaped elements sliding into one another, the device according to the invention ensures a correct and perfect fit. It is also ensured that no unnecessary play occurs and an automatic and continuous readjustment is carried out when wear occurs. Mounting is guaranteed at poorly accessible places due to the spring which acts automatically to a great extent and connects the two elements with one another securely and reliably. During disassembly, the guide rod, whose length is adapted to the assembly and disassembly conditions, enables simple detachment of the two parts from one another in an economical manner. The compact and robust construction forms a relatively simple open-closed tool.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 shows a side view of a cable pull with a molded part;

FIG. 2 shows a side view of the double-abutment;

FIG. 3 shows a cable pull with molded part in a top view; and

FIGS. 4 to 6 show section A—A of FIGS. 1 to 3.

DETAILED DESCRIPTION OF THE PREFERRED EMBODIMENTS

FIG. 1 shows the cable pull 2 in the molded part 3 which has conical support surfaces 5 at the bottom. The guide rod 10 leads into the molded part 3 opposite to the cable pull 2. As is shown in FIG. 4, the guide rod 10 is supported by its conical part against the lock 8 and is tensioned against the lock 8 by a spring 6. This lock 8 has an opening below the closed surface which, in the present case, is a round hole for the guide rod 10. As is shown in section in FIG. 4, the middle portion of the molded part 3 is formed of two planes into which the perforated plate 4 of the abutment 1 can be inserted.

FIG. 2 shows the abutment 1 comprising the base plate, the self-locking wedge 7 and the stop 9. This stop 9 is arranged exactly opposite the lock 8.

When the molded part 3 is pressed onto the abutment 1 by the assembler as is shown in FIGS. 5 and 6, the stop 9 pushes the lock 8 upward by a short distance relative to the wedge-shaped end of the guide rod 10 until the wedge-shaped end slides into the hole of the lock 8 propelled by the spring 6 and accordingly creates a connection between the perforated plate 4 and the molded part 3, wherein the lock 8 is pushed completely upward and the molded part 3 with the conical support surfaces 5 is pulled firmly onto the self-locking wedge of the abutment 1. This forms a fixed connection without play even when the assembler has poor access to the mounting position in question.

FIG. 3 shows the device according to the invention in a top view, wherein it is clear that two cable pulls 2 project into the molded part in the present embodiment. The abutment 1 is shown as a double abutment, i.e., for two cable pulls 2.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. An abutment and a molded part for fastening actuating pulls, comprising: an abutment having a base plate with an axis and a self-locking wedge in an axial direction, a perforated plate with a stop which protrudes relative to the base plate; a molded part into which at least one cable pull projects so as to be enclosed and held by the molded part, the molded part having a conical support surface into which the self-locking wedge fits; a guide rod with a wedge-shaped end that projects into the molded part so as to snap into an opening of the perforated plate of the abutment in a self-locking and automatic manner; and a lock at the molded part configured to provide a connection between the abutment and the molded part, the stop of the abutment being arranged so as to release the lock to permit the guide rod to project into the opening in the perforated plate to lock the abutment and the molded part together.

2. A device according to claim 1, wherein the abutment is constructed as a double-abutment.

3. A device according to claim 1, wherein the perforated plate is arranged between wedge surfaces of the wedge.

4. A device according to claim 1, wherein the at least one cable pull is arranged opposite the guide rod.

5. A device according to claim 1, and further comprising a spring operatively arranged to press the guide rod toward the lock.

6. A device according to claim 1, wherein the molded part is made of plastic and forms a unit with the cable pull.

* * * * *